(12) United States Patent
Oesterle et al.

(10) Patent No.: US 11,186,243 B2
(45) Date of Patent: Nov. 30, 2021

(54) METHODS AND DEVICES FOR TRIGGERING PERSONAL PROTECTION DEVICES HAVING A COMMON SYSTEM TIME

(71) Applicant: Robert Bosch GmbH, Stuttgart (DE)

(72) Inventors: Florian Oesterle, Stuttgart (DE); Heiko Freienstein, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 16/468,492

(22) PCT Filed: Dec. 11, 2017

(86) PCT No.: PCT/EP2017/082182
§ 371 (c)(1),
(2) Date: Jun. 11, 2019

(87) PCT Pub. No.: WO2018/108792
PCT Pub. Date: Jun. 21, 2018

(65) Prior Publication Data
US 2020/0070761 A1  Mar. 5, 2020

(30) Foreign Application Priority Data
Dec. 15, 2016 (DE) .................. 10 2016 225 061.2

(51) Int. Cl.
*B60R 21/0132* (2006.01)
*G07C 5/08* (2006.01)
*H04L 29/06* (2006.01)
*B60R 21/01* (2006.01)
*H04L 29/08* (2006.01)

(52) U.S. Cl.
CPC ............ *B60R 21/0132* (2013.01); *G07C 5/08* (2013.01); *H04L 69/28* (2013.01); *B60R 2021/01286* (2013.01); *H04L 67/12* (2013.01)

(58) Field of Classification Search
CPC ...... B60R 21/0132; B60R 2021/01286; B60R 21/013; G07C 5/08; H04L 69/28; H04L 67/12
See application file for complete search history.

(56) References Cited

U.S. PATENT DOCUMENTS

| | | | |
|---|---|---|---|
| 9,043,130 B2 * | 5/2015 | Ricci ........................ | B60R 7/04 701/301 |
| 9,103,671 B1 * | 8/2015 | Breed ................... | G01S 13/931 |
| 9,487,217 B2 * | 11/2016 | Tsuchida ............. | B60W 30/085 |

(Continued)

FOREIGN PATENT DOCUMENTS

| | | |
|---|---|---|
| CN | 101405676 A | 4/2009 |
| CN | 103109478 A | 5/2013 |

(Continued)

OTHER PUBLICATIONS

International Search Report dated Apr. 23, 2018 of the corresponding International Application PCT/EP2017/082182 filed Dec. 11, 2017.

*Primary Examiner* — Geepy Pe
*Assistant Examiner* — Daniel Tyler Reich
(74) *Attorney, Agent, or Firm* — Norton Rose Fulbright US LLP; Gerard Messina

(57) ABSTRACT

Triggering personal protection devices for a vehicle with the aid of a sensor having a local sensor time set with respect to a common system time.

18 Claims, 3 Drawing Sheets

(56) References Cited

U.S. PATENT DOCUMENTS

| | | | | |
|---|---|---|---|---|
| 2007/0228705 A1* | 10/2007 | Rao | ............... | B60R 21/0134 |
| | | | | 280/735 |
| 2014/0214271 A1 | 7/2014 | Choi et al. | | |
| 2015/0298636 A1* | 10/2015 | Furst | ............. | B60R 22/00 |
| | | | | 701/45 |
| 2016/0080533 A1* | 3/2016 | Jeon | ............... | H04L 12/403 |
| | | | | 370/402 |
| 2016/0094937 A1* | 3/2016 | Wang | ............... | H04W 4/021 |
| | | | | 455/456.3 |

FOREIGN PATENT DOCUMENTS

| | | | | |
|---|---|---|---|---|
| CN | 103 522 970 | | 1/2014 | |
| CN | 104254761 A | | 12/2014 | |
| CN | 104683091 A | | 6/2015 | |
| EP | 3 088 730 | | 11/2016 | |
| EP | 3 109 098 | | 12/2016 | |
| JP | 2016107925 A | | 6/2016 | |
| WO | 2015183677 A1 | | 12/2015 | |
| WO | WO-2015183677 A1 * | | 12/2015 | ............. H04W 4/08 |
| WO | 2016/097121 | | 6/2016 | |

\* cited by examiner

METHODS AND DEVICES FOR TRIGGERING PERSONAL PROTECTION DEVICES HAVING A COMMON SYSTEM TIME

FIELD OF THE INVENTION

The present invention relates to a system for triggering personal protection devices. The system is made up of at least a control unit for triggering personal protection devices and sensors for acquiring signals, as a function of which personal protection devices are triggered. In addition, the present invention relates to corresponding methods for operating the sensors and the control unit. An important core of the present invention is a common time base of the components of the system for triggering personal protection devices, that is, of the sensors and of the control unit.

BACKGROUND INFORMATION

Modern systems for triggering personal protection devices use data from different sources for optimum occupant protection functionality in the case of a collision. These systems are made up of many components, which have been set up and optimized, first and foremost, for other functions. For example, these systems consider environmental data, such as information from, e.g., radar or lidar systems, as well as operating dynamics data, in order to attain optimum protective functionality for the occupants in the case of a collision. Depending on the function, optimum means a very rapid reaction time of the personal protection and/or restraining devices, and alternatively or additionally, adaptive protection functionality (that is, specific responses as a function of the present or estimated crash type, the ascertained occupant type, the detected occupant position, etc. . . . ).

The specific components provide their data to the system for triggering personal protection devices, via suitable interfaces.

These days, the age of the specific data, which collect, for example, in the control unit for triggering personal protection devices (e.g., the airbag control unit), is not exactly known. There are latency times for measurements, subsequent processing, calculations, transmission, etc. . . . , which are even variable over time, that is, subject to jitter. In the event of a decision for, e.g., activations prior to the actual impact (so-called pre-crash activations), a conservatively estimated, that is, comparatively high, uncertainty has to be expected. Due to the high time-related demands on future systems for triggering personal protection devices, usefulness is lost.

The estimated time of impact and the relative speed of a potentially dangerous object, that is, a collision object, are particularly important, if, for example, the environmental data are only (intended to be) valid for a certain period of time.

If contact sensors react within this period of time, and if certain threshold values are exceeded by the sensor signals of the contact sensors, then the relative speed is incorporated in the triggering decision for the personal protection devices. The incorporation assists, for example, in the separation of triggering collisions (fire crashes), e.g., in the case of a relative speed of more than 20 km/h, and non-triggering collisions (no-fire crashes), e.g., up to a relative speed of 16 km/h. A further area of application of the additional data is the selection of the stages to be fired in multi-stage and/or adaptive personal protection devices, such as airbags.

SUMMARY OF THE INVENTION

To that end, the present invention provides a common time base for the components, that is, at least for the sensors, in particular, the surround sensors, as well as the control unit of a future system for triggering personal protection devices.

Accordingly, the essence of the present invention is to introduce a common time base for future systems for triggering personal protection devices, in order to be able to reckon with the actual age of the information or data and, consequently, to be able to make more accurate triggering decisions.

A common time base increases the usefulness, while having a very small effect on the rate of false triggering. In order to keep the rate of false triggering low, the time window must be selected to be as small as possible. A large time window does increase the usefulness, that is, the possibility of triggering personal protection devices, but simultaneously increases the risk of a false triggering, if, within an open time window, it coincides with a signal of a contact sensor (e.g., due to the impact of a rock or the like). In order to be able to keep the time window as small as possible, knowledge of the age of the data (information of the surround sensors or the contact sensors), which is as accurate as possible, is necessary. Using a common time base according to the present invention, the age of an information item may be determined highly accurately.

In addition, the accuracy of the determination of the (expected) relative speed at the time of impact may be improved with the aid of a common time base, since according to the following formula, it is apparent that the relative speed at the time of impact is a linear function of the estimated time of impact and/or the estimated time until impact (time to impact; TTI).

$$v_{predicted\ at\ instant\ of\ impact} = v_{last\ measurement} \pm a_{cumulative} \cdot t_{time\ to\ impact}$$

$v_{predicted\ at\ instant\ of\ impact}$ denotes the relative speed at the time of impact.

$v_{last\ measurement}$ denotes the relative speed at the time of the last measurement.

$a_{cumulative}$ denotes an acceleration, which takes into account, e.g., possible deceleration of the vehicle and, possibly, of the collision object. This value may be an empirical estimation or an estimation dependent on further information, such as the detected type of collision object.

$t_{time\ to\ impact}$ denotes the estimated time until impact, which may be determined, for example, from the difference of the current time and the estimated time of impact.

If the time and, therefore, the age of the last measurement are known, then the uncertainty in the estimation of the relative speed may be reduced markedly, since conservative assumptions do not have to be made.

In addition, the present invention provides a method of operating a sensor for a system for triggering personal protection devices for a vehicle; the sensor having a local clock for a local sensor time; the method including the steps: receiving a message, which contains information regarding a common system time;
setting the local clock with respect to the common system time.

The method is suitable, in particular, for operating a surround sensor.

It proves to be advantageous, when the message, i.e., the data, complies with the specifications of the Network Time Protocol.

A surround sensor is presently understood to be a sensor, which measures physical effects in the surroundings of the vehicle. It is understood to include, inter alia, video, radar, ultrasonic and lidar sensors.

Personal protection devices are presently understood to be devices, which, in the case of a collision of the vehicle with a collision object, are suitable for protecting the occupant(s) of the vehicle from injury or for lessening unavoidable injury. They are understood to include, inter alia, airbags, belt tensioners, active headrests and active roll bars.

To put in relation to is presently understood to mean that the transmitted, common system time influences the local sensor time. This may take place in many different ways. For example, the local sensor time could be equated to the common system time. It would also be conceivable to calculate a correction factor, such as an offset, as a function of local sensor time and transmitted, common system time. In addition, it would also be possible to influence the local clock as a function of the transmitted, common system time, e.g., to induce it to time more rapidly or slowly.

According to one advantageous specific embodiment of the method, the method includes the additional step of sending a message, which includes an information item regarding the local sensor time.

It proves to be advantageous, when the message, i.e., the data, complies with the specifications of the Network Time Protocol.

After the step of setting the local clock, it is also advantageous to send a message, which indicates successful setting. This provides a system of the highest functionality and safety specifications, since the sent message may take place as part of a handshake algorithm.

A further advantage is that the received message and the sent message may be used for diagnosing the operability of the sensor. If such a diagnosis reveals, for example, that the desired operability of the sensor is not present, then the system may be operated on a fallback level, on which greater tolerances with respect to the sensor signals are assumed for triggering the personal protection devices.

In a further aspect, the present invention provides a method of supplying a sensor value of a sensor for a system for triggering personal protection devices for a vehicle; the sensor being operated in accordance with a specific embodiment of the method for operating a sensor according to the present invention, the method including the step:
sending a message, which includes an information item regarding the currently acquired sensor value and an information item regarding the time of acquisition.

In this context, the time of acquisition may presently refer to the local sensor time or, alternatively or additionally, to the common system time.

The method is suitable, in particular, for providing sensor values of a surround sensor.

It proves to be advantageous, when the message, i.e., the data, complies with the specifications of the Network Time Protocol.

In a further aspect, the present invention provides a method of operating a system clock for a system for triggering personal protection devices for a vehicle; the method including the periodic step:
sending a message, which contains an information item regarding a common system time.

A period of 1 Hz has been shown to be advantageous for carrying out the step. This comparatively long period allows, on the one hand, a well-synchronized, common time base to be attained and, on the other hand, the message traffic for synchronization within the system to be kept as low as possible.

It proves to be advantageous, when the message, i.e., the data, complies with the specifications of the Network Time Protocol.

In a further aspect, the present invention provides a method for diagnosing a common system time in a system for triggering personal protection devices; the system having at least one first surround sensor and one second surround sensor; the method including the steps:
receiving a first message from the first surround sensor, the message including first sensor signals and a first, local time of acquisition;
receiving a second message from the second surround sensor, the message including second sensor signals and a second, local time of acquisition;
ascertaining a landmark from the first sensor signals;
ascertaining the landmark from the second sensor signals;
comparing the first and second local acquisition times with respect to the landmark;
determining a common system time.

This aspect of the present invention is based on the realization that a diagnosis of the common system time may be carried out with the aid of landmarks or clearly defined movements of landmarks. In this case, landmarks are to be understood as stationary objects, which are detected by surround sensors. A movement of the landmark only appears to take place in response to traveling by the landmark. From the point of view of the system for triggering personal protection devices, a landmark executes a movement upon being driven past. Now if, during the determination of landmarks, the same landmark is detected in the sensor signals of at least two different surround sensors of the system, then, using the local acquisition times, it may easily be discerned if the establishment of a common system time has proceeded successfully. This may be recognized particularly effectively in light of clearly defined movements of landmarks. An example of such a clearly defined movement is turning into a curve. In this case, it may be discerned particularly easily, if a common system time has been able to be established. If this is not the case, then such an error readily stands out, since in the different sensor signals, the landmark carries out the clearly defined movement, that is, the clearly discernible operation, in a time-staggered manner. If the local acquisition times of the same landmark differ significantly in the sensor signals of at least two different surround sensors, then a common system time may not be determined. Otherwise, it may be determined that a common system time was able to be established successfully.

It proves to be advantageous, when the messages, i.e., the data, comply with the specifications of the Network Time Protocol.

In one further aspect, the present invention provides a method of operating a system for triggering personal protection devices for a vehicle; the system including at least one sensor; the at least one sensor being operated in accordance with the advantageous specific embodiment of the method for operating a sensor according to the present invention; the method including the steps:
sending a message, which contains an information item regarding the common system time, to the at least one sensor;
receiving a message, which contains an information item regarding a local sensor time, from the at least one sensor;

determining the operability of the sensor with the aid of the received message;

operating the system for triggering personal protection devices in a precise mode, if the sensor has been determined to be operable, or in a conservative mode, if the sensor has not been determined to be operable.

The method is suitable, in particular, for operating a system having a surround sensor as the at least one sensor.

It proves to be advantageous, when the messages, i.e., the data, comply with the specifications of the Network Time Protocol.

A precise mode is presently understood to be a mode, in which the system is operated with tight tolerances. Operating the system with tight tolerances has the advantage, that instances of false triggering are prevented as much as possible.

A conservative mode is presently understood to be a mode, in which the system is correspondingly operated with high tolerances. Operating the system with high tolerances is provided, when the sensor signals or features of the sensor signals, such as their quality or also the knowledge of their age, are encumbered with high tolerances.

According to one specific embodiment of the method of operating a system for triggering personal protection devices for a vehicle, the method includes the following additional steps:

detecting a potential collision opponent with the aid of the at least one surround sensor;

sending a message, which contains an information item regarding the common system time, to the potential collision opponent; in particular, the message and/or the information item complying with the specifications of the Network Time Protocol;

receiving a message, which contains an information item regarding a system time of a collision opponent, from the potential collision opponent; in particular, the message and/ or the information item complying with the specifications of the Network Time Protocol;

and, in the step of operating the system for triggering personal protection devices, operating the system as a function of the local system time of the collision opponent.

According to this specific embodiment, the common system time is expanded to further road users, in particular, potential collision opponents. In particular, in the pre-crash phase, that is, in the phase after determining a significantly high probability of collision with a potential collision opponent, and prior to actually colliding with the collision opponent, this specific embodiment of the method has the advantage that countermeasures, inter alia, the triggering of personal protection devices, may be coordinated with the potential collision opponent, in order to be able to react particularly precisely to the imminent collision.

In this context, the transmitting and receiving may take place directly with the collision opponent or with further road users or with communication towers, with the aid of an ad-hoc network or with the aid of car-to-car and/or car-to-infrastructure communication.

In one further aspect, the present invention provides a method of triggering personal protection devices for a vehicle, including the steps:

receiving at least one sensor value from at least one surround sensor and at least one sensor value from at least one contact sensor; the at least one surround sensor being operated in accordance with a specific embodiment of the method for operating a sensor according to the present invention; and the at least one surround sensor providing the sensor value in accordance with the method for providing a sensor value according to the present invention;

estimating a time of impact with a collision object or, alternatively or additionally, a relative speed of the collision object at the time of acquisition, based on the at least one sensor value of the at least one surround sensor;

determining a relative speed of the collision object at the time of impact, based on the estimated relative speed and the estimated time of impact;

triggering the personal protection devices as a function of the determined relative speed and/or the estimated time of impact, as well as of the at least one sensor value of the contact sensor.

A contact sensor is presently understood to be a sensor, which is suitable for measuring a physical effect that occurs in response to contact with a collision object. It is understood to include, inter alia, acceleration, pressure and structure-borne noise sensors.

A collision object is presently understood to be an object, that is, an opposing vehicle, a person, or an object, with which a collision is possible or unavoidable in the near future, and/or with which a collision has occurred.

According to one advantageous specific embodiment of the method, the personal protection devices are only triggered, if the at least one sensor value of the contact sensor has been acquired and/or is received in a predetermined time interval about the estimated time of impact.

According to one advantageous specific embodiment of the method, the method is implemented in a system, which is operated in accordance with a method of operating a system for triggering personal protection devices for a vehicle according to the present invention; the predetermined time interval being a function of the mode, in which the system is operated.

A further aspect of the present invention is a sensor; the sensor including a local clock; and the sensor being operated in accordance with a method for operating a sensor according to the present invention, and being configured to carry out a method for providing a sensor value according to the present invention.

According to one specific embodiment of the sensor, the sensor is a surround sensor.

A further aspect of the present invention is a system clock; the system clock being operated in accordance with a method for operating a system clock according to the present invention.

A further aspect of the present invention is a control unit, which includes a system clock according to the present invention and is configured to execute a specific embodiment of the method of triggering personal protection devices for a vehicle according to the present invention.

A control unit for triggering personal protection devices for a vehicle (e.g., an airbag control unit) has proven to be advantageous, since it has real-time capability and its configuration satisfies the most stringent requirements for, e.g., robustness, availability, etc.

A further aspect of the present invention is a system for triggering personal protection devices for a vehicle, the system including at least one sensor according to the present invention and at least one control unit according to the present invention, and being configured to implement a method of operating a system for triggering personal protection devices for vehicle according to the present invention.

A further aspect of the present invention is a computer program, which is configured to execute all steps of one of the methods according to the present invention.

A further aspect of the present invention is a machine-readable storage medium, in which a computer program of the present invention is stored.

The present invention also provides a diagnosis or fallback level. A diagnosis of the established, common time base may take place in that, in the utilized transmission systems, such as bus systems, messages collide with each other, and, in the process, a message having higher priority is ascertained.

In addition, the repeated, unsuccessful attempt to establish a common time base may be detected. From this, it may also be diagnosed that a problem with establishing a time base is present in the system. As a countermeasure, the system for triggering personal protection devices for a vehicle would be operated in the mode referred to above as conservative.

In the following, specific embodiments of the present invention are represented and explained with the aid of figures.

DETAILED DESCRIPTION

Figure 1:
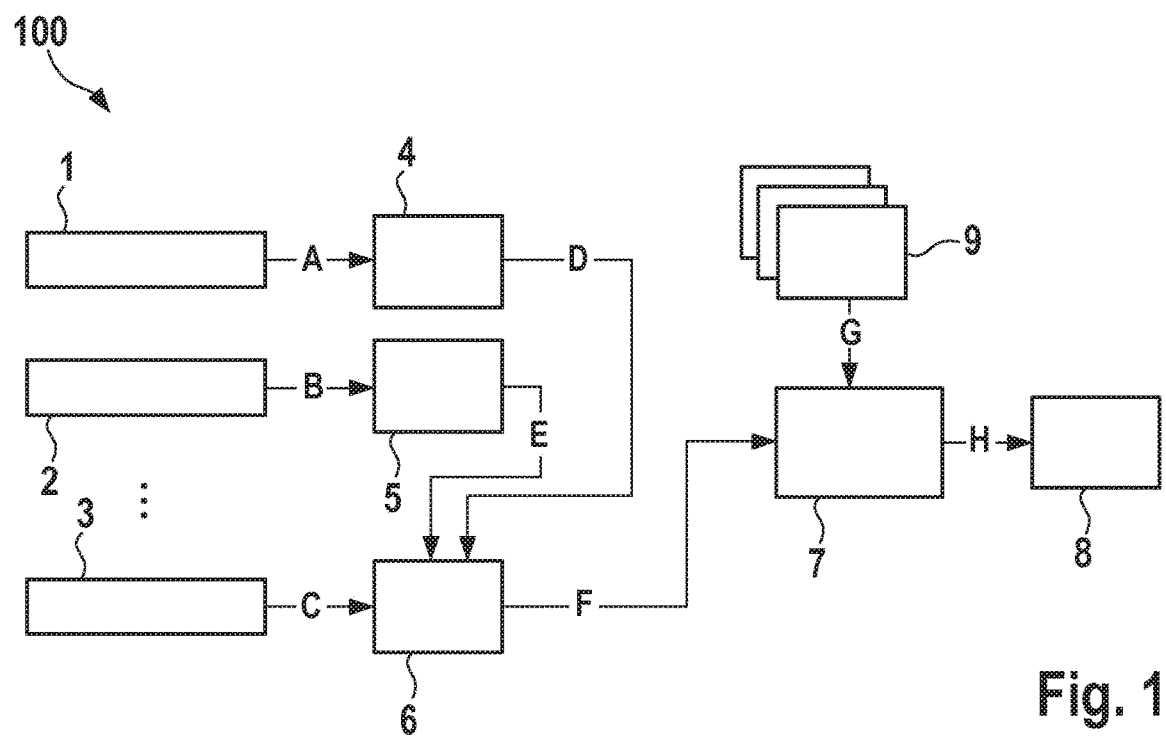
FIG. 1 shows a block diagram of a specific embodiment of the system for triggering personal protection devices for a vehicle.
Figure 2:
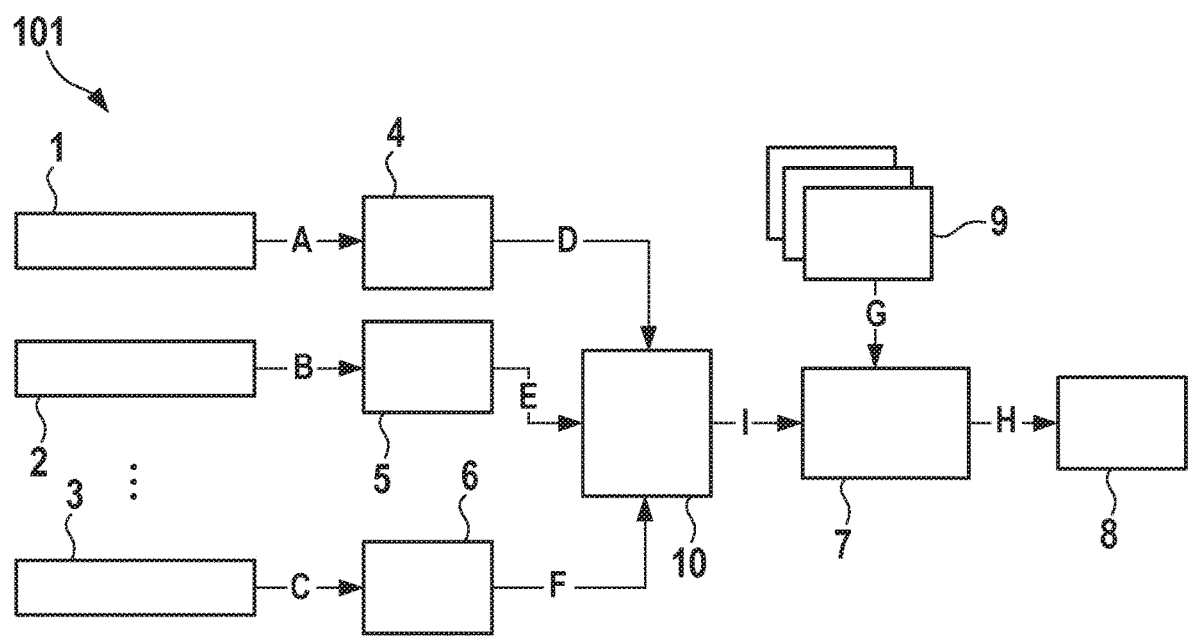
FIG. 2 shows a block diagram of an alternative specific embodiment of the system for triggering personal protection devices for a vehicle.

FIGS. 1 and 2 shows specific exemplary embodiments of a system 100, 101 for triggering personal protection devices 8 for a vehicle according to the present invention.

The possible architecture 100 represented in FIG. 1 shows surround sensors 1, 2, 3 with associated processing units 4, 5, 6, which process signals A, B, C of surround sensors 1, 2, 3.

One of the processing units constitutes a master unit 6. This processing unit 6 aggregates the environmental signals of the other surround sensors 1 and 2. To that end, processing units 4 and 5 supply their processed environmental signals D, E to master unit 6.

Master unit 6 supplies aggregated environmental signals F to a further fusion unit 7. This fusion unit 7 additionally receives signals G of contact sensors 9 and combines these with aggregated environmental signals G, in order to control/trigger personal protection devices 8 as a function of an evaluation of merged signals H.

According to one specific embodiment of the present invention, master unit 6 takes on the diagnosis of the common system time. This may be accomplished, since in order to aggregate the sensor signals of the other surround sensors, the master unit already evaluates and processes the sensor signals of these sensors.

According to a further specific embodiment of the present invention, the local system time of a potential collision opponent is taken into account to operate system 100, 101. In this specific embodiment, fusion unit 7 takes over the coordination of the common system time with the local system time of the potential collision opponent. Fusion unit 7 obtains the local system time of the potential collision opponent via a communication unit, which is not shown and sets up an ad-hoc network either directly with the collision opponent or with a further road user or a communication tower, or uses the communication devices of the car-to-car or car-to-infrastructure communication.

The alternative architecture 101 represented in FIG. 2 has essentially the same elements. In the specific embodiment according to FIG. 2, a separate processing unit 10, in particular, a safety control unit, takes on the role of the master unit.

According to this specific embodiment, processed signals D, E, F of surround sensors 1, 2, 3 are supplied to safety control unit 10. There, signals D, E, F are aggregated to form a signal I.

This aggregated signal I is then supplied to fusion unit 7, in order to be merged there with signals G of contact sensors 9, and evaluated, as in the specific embodiment according to FIG. 1.

The transmission of data from surround sensors 1, 2, 3, to their processing units 4, 5, 6 takes place internally. This means that processing units 4, 5, 6 are typically situated near the sensor elements of surround sensors 1, 2, 3, typically, in the same housing. Due to this, transmission times of signals A, B, C between the sensor element and processing unit 4, 5, 6 for use in the system 100, 101 for triggering personal protection devices 8 for a vehicle are negligible.

This is also the case for the dedicated transmission of signals G of contact sensors 9 to fusion unit 7. In this case, for example, the PSI5 standard may be used for the transmission. Due to this, fluctuations in the transmission times occur to a lesser extent and may also be corrected in accordance with the standard.

For use in system 100, 102, the processing time in low-level processing units 4, 5, 6 and 10, as well as the transmission times via bus systems, as are typically present between processing units 4, 5, 6, 10 and 7, are weighted more heavily. The reason for this is that the processing and transmission times are a function of the amount of data arising, and that therefore, fluctuations may occur. Due to these fluctuations, the age of the sensor data in units 10 and 7 is distorted. This has an effect on the evaluation and, consequently, on the triggering performance of system 100, 101 for triggering personal protection devices 8.

In this context, not only the common CAN bus comes into consideration as bus systems for the signal transmission. On the contrary, any line-conducted or also radio-based transmission system is conceivable.

The present invention provides a solution for the problem of distorted signal age, by establishing a common time base in system 100, 101.

In one instance of broadening, it would even be conceivable for the common time base not only to be implemented in system 100, 101 for triggering personal protection devices 8, but also to be established in the vehicle along with other systems. In this context, e.g., the construction of, or the expansion to, a synchronization network would be conceivable. This is a possibility, since many vehicle systems are already interconnected by the bus systems used.

Figure 3:
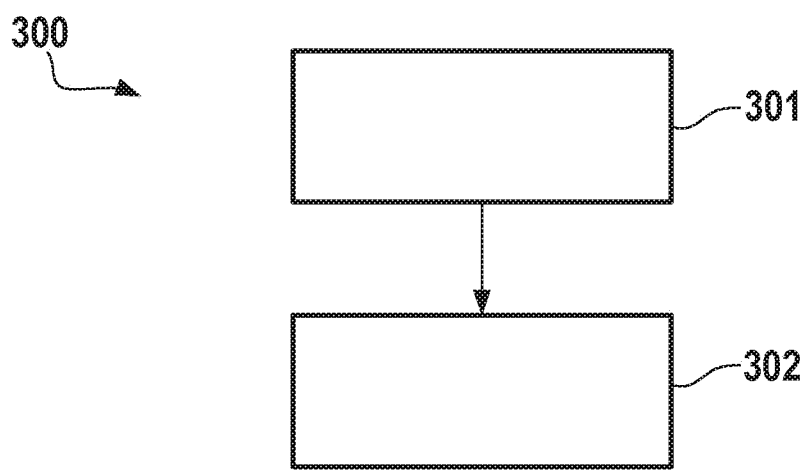
FIG. 3 shows a flow chart of a specific embodiment of a method for operating a sensor.

FIG. 3 shows a flow chart of a specific embodiment of a method 300 of the present invention for operating a sensor 1, 2, 3 having a local clock.

In step 301, a message is received, which contains an information item regarding a common system time.

In step 302, the local clock is set with respect to the common system time.

Figure 4:
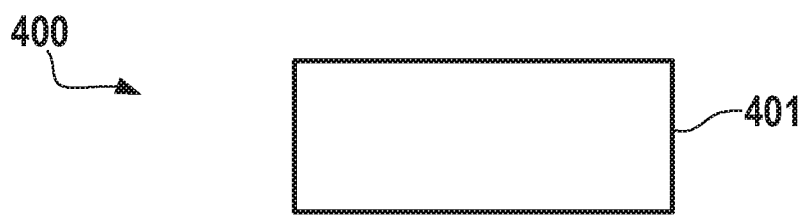
FIG. 4 shows a flow chart of a specific embodiment of a method for providing a sensor value.

FIG. 4 shows a flow chart of a specific embodiment of a method for supplying a sensor value of a sensor 1, 2, 3.

In step 401, a message A, B, C is sent, which includes an information item regarding the currently acquired sensor value and an information item regarding the time of acquisition.

Figure 5:
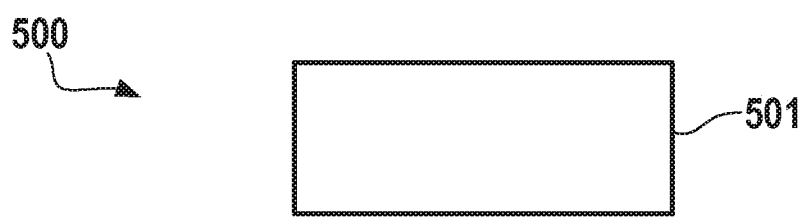
FIG. 5 shows a flow chart of a specific embodiment of a method of operating a system clock for a system for triggering personal protection devices for a vehicle.

FIG. 5 shows a flow chart of a specific embodiment of a method of operating a system clock for a system for triggering personal protection devices for a vehicle according to the present invention. In step 501, a message is sent, which contains an information item regarding the common system time.

Figure 6:
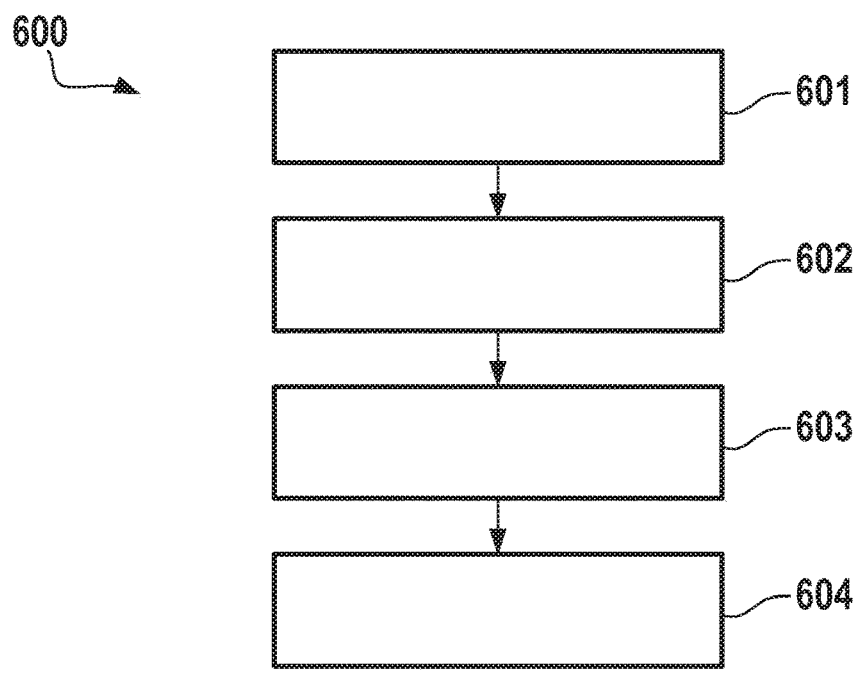
FIG. 6 shows a flow chart of a specific embodiment of a method of operating a system for triggering personal protection devices for a vehicle.

FIG. 6 shows a flow chart of a specific embodiment of a method of operating a system 100, 101 for triggering personal protection devices 8 for a vehicle according to the present invention.

In step 601, a message, which includes an information item regarding the common system time, is sent to at least one sensor 1, 2, 3, 9.

In step 602, a message, which contains an information item regarding the local sensor time, is received by the least one sensor 1, 2, 3, 9.

In step 603, the operability of sensor 1, 2, 3, 9 is determined from the received message.

In step 604, system 100, 101 is operated in a precise or in a conservative mode as a function of the determined operability of sensor 1, 2, 3, 9.

Figure 7:
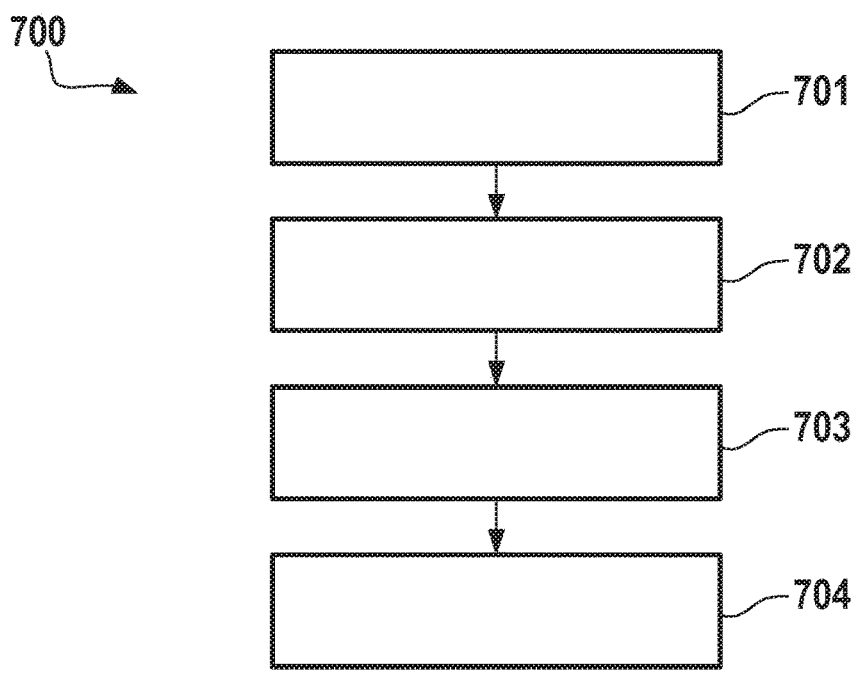
FIG. 7 shows a flow chart of a specific embodiment of a method of triggering personal protection devices for a vehicle.

FIG. 7 shows a flow chart of a specific embodiment of a method 700 for triggering personal protection devices 8 for a vehicle according to the present invention.

In step 701, at least one sensor value A, B, C, D, E, F, I of at least one surround sensor 1, 2, 3 and at least one sensor value G of at least one contact sensor 9 are received.

In step 702, a time of impact with a collision object and/or a relative speed of the collision object at the time of acquisition is estimated, based on sensor value A, B, C, D, E, F, I of the at least one surround sensor 1, 2, 3.

In step 703, a relative speed of the collision object at the time of impact is determined, based on the estimated relative speed and the estimated time of impact.

In step 704, personal protection devices 8 are triggered as a function of the determined relative speed and/or the estimated time of impact, and as a function of the at least one sensor value G of contact sensor 9.

In this context, depending on the relative speed and/or the time of impact, a threshold value for triggering in a time window about the time of impact is typically adjusted as a function of the determined or estimated relative speed. In this connection, adjusting may mean increasing or decreasing. It may also mean that the threshold value is a threshold value changeable over time, and that an adjustment of the threshold value manifests itself in an adaptation or selection of the time characteristic of the threshold value. In order to decide if personal protection devices 8 are to be triggered, sensor value G of contact sensor 9 is compared to the threshold value.

What is claimed is:

1. A method for operating at least one sensor arrangement of a system for triggering a personal protection device for a vehicle, the method comprising:

receiving a message, which contains an information item regarding a common system time; and setting a local clock with respect to the common system time, wherein the at least one sensor arrangement includes a plurality of sensors and/or surround sensors, and wherein the at least one sensor arrangement includes the local clock for a local sensor time, wherein a plurality of processing units are correspondingly coupled to the plurality of sensors and/or surround sensors, wherein one of the plurality of processing units is a master unit or the plurality of processing units is coupled to a safety control unit, and wherein the master unit aggregates environmental signals of other ones of the plurality of sensors and/or surround sensors, or the safety control unit aggregates the environmental signals of the plurality of sensors and/or surround sensors, wherein an aggregated environmental signal is supplied, via the master unit or the safety control unit, to a fusion unit, wherein the fusion unit receives contact signals from a plurality of contact sensors, and wherein the fusion unit merges and evaluates the contact signals and the aggregated environmental signal, and wherein the fusion unit is coupled to and is configured to trigger the personal protection device.

2. The method of claim 1, further comprising:
sending a message containing an information item regarding the local sensor time.

3. The method of claim 2, further comprising:
sending a first message, which includes a first information item regarding the common system time, to the at least one sensor arrangement;

receiving a second message, which contains a second information item regarding a local sensor time, from the at least one sensor arrangement;

determining an operability status of the sensor with the second message; and operating the system for triggering the personal protection device in a precise mode, if the at least one sensor arrangement has been determined to be operable, or in a conservative mode, if the at least one sensor arrangement has not been determined to be operable.

4. The method of claim 3, further comprising:
detecting a potential collision opponent with at least one surround sensor;

sending a third message, which contains a third information item regarding the common system time, to the potential collision opponent;

receiving a fourth message, which contains a fourth information item regarding a local system time of the potential collision opponent, from the potential collision opponent; and operating, in the operating of the system for triggering the personal protection device, the system as a function of the local system time of the potential collision opponent.

5. The method of claim 3, wherein one of the first message, the second message, the first information item, and the second information item complies with specifications of a Network Time Protocol.

6. The method of claim 1, further comprising:
sending a message, which includes an information item regarding a currently acquired sensor value and an information item regarding a time of acquisition, the time of acquisition being in relation to the local sensor time or to the common system time.

7. The method of claim 1, wherein the message and/or the information item complies with specifications of a Network Time Protocol.

8. A method for operating a system clock for a system for triggering a personal protection device for a vehicle, the method comprising:
periodically sending a message, which contains an information item regarding a common system time,
wherein the system includes at least one sensor arrangement having a plurality of sensors and/or surround sensors,
wherein a plurality of processing units are correspondingly coupled to the plurality of sensors and/or surround sensors,
wherein one of the plurality of processing units is a master unit or the plurality of processing units is coupled to a safety control unit, and
wherein the master unit aggregates environmental signals of other ones of the plurality of sensors and/or surround sensors, or the safety control unit aggregates the environmental signals of the plurality of sensors and/or surround sensors, wherein an aggregated environmental signal is supplied, via the master unit or the safety control unit, to a fusion unit,
wherein the fusion unit receives contact signals from a plurality of contact sensors, and wherein the fusion unit merges and evaluates the contact signals and the aggregated environmental signal, and
wherein the fusion unit is coupled to and is configured to trigger the personal protection device.

9. The method of claim 8, wherein the message and/or the information item complies with specifications of a Network Time Protocol.

10. A method for triggering a personal protection device for a vehicle, the method comprising:
receiving at least one sensor value from at least one sensor arrangement, which includes at least one surround sensor and at least one sensor value, from at least one contact sensor, wherein the at least one surround sensor is operated for a system for triggering the personal protection device for the vehicle, by performing the following:
receiving a message, which contains an information item regarding a common system time; and
setting a local clock with respect to the common system time; and
sending a message, which includes an information item regarding the currently acquired sensor value and an information item regarding the time of acquisition, the time of acquisition being in relation to a local sensor time or to the common system time;
estimating a time of impact with a collision object and/or a relative speed of the collision object at the time of acquisition, based on the at least one sensor value of the at least one surround sensor;
determining a relative speed of the collision object at the time of impact, based on the relative speed estimated and/or the estimated time of impact estimated; and
triggering the personal protection device as a function of the relative speed determined and/or the time of impact estimated, and of the at least one sensor value of the contact sensor
wherein the at least one sensor arrangement includes a plurality of sensors and/or surround sensors, and
wherein the at least one sensor arrangement includes the local clock for a local sensor time, wherein a plurality of processing units are correspondingly coupled to the plurality of sensors and/or surround sensors,
wherein one of the plurality of processing units is a master unit or the plurality of processing units is coupled to a safety control unit, and
wherein the master unit aggregates environmental signals of other ones of the plurality of sensors and/or surround sensors, or the safety control unit aggregates the environmental signals of the plurality of sensors and/or surround sensors,
wherein an aggregated environmental signal is supplied, via the master unit or the safety control unit, to a fusion unit, wherein the fusion unit receives contact signals from a plurality of contact sensors, and
wherein the fusion unit merges and evaluates the contact signals and the aggregated environmental signal, and
wherein the fusion unit is coupled to and is configured to trigger the personal protection device.

11. The method of claim 10, wherein the personal protection device is only triggered, if the at least one sensor value of the contact sensor has been acquired and/or is received in a predetermined time interval about the estimated time of impact.

12. The method of claim 11, wherein the predetermined time interval is a function of the mode, in which the system is operated, and wherein the at least one surround sensor is operated for the system for triggering a personal protection device for a vehicle, by performing the following:
receiving a message, which contains an information item regarding a common system time; and
setting the local clock with respect to the common system time; and
sending a message, which contains an information item regarding the local sensor time.

13. A sensor, comprising:
at least one surround sensor having a local clock for a local sensor time;
wherein the at least one surround sensor is operated for a system for triggering a personal protection device for a vehicle, by performing the following:
receiving a first message, which contains a first information item regarding a common system time; and
setting the local clock with respect to the common system time; and
performing at least one of:
sending a second message, which contains a second information item regarding the local sensor time; and/or
sending a third message, which includes an information item regarding a currently acquired sensor value and a third information item regarding a time of acquisition, the time of acquisition being in relation to the local sensor time or to the common system time,
wherein the at least one sensor arrangement includes a plurality of sensors and/or surround sensors, and
wherein the at least one sensor arrangement includes the local clock for a local sensor time,
wherein a plurality of processing units, each consisting of a processor, are correspondingly coupled to the plurality of sensors and/or surround sensors,
wherein one of the plurality of processing units is a master unit or the plurality of processing units is coupled to a safety control unit, consisting of a processor, and
wherein the master unit aggregates environmental signals of other ones of the plurality of sensors and/or surround sensors, or the safety control unit aggregates the environmental signals of the plurality of sensors and/or surround sensors, wherein an aggregated environmental signal is supplied, via the master unit or the safety control unit, to a fusion unit, consisting of a processor, wherein the fusion unit receives contact signals from a plurality of contact sensors, and wherein the fusion unit merges and evaluates the contact signals and the aggregated environmental signal, and wherein the fusion unit is coupled to and is configured to trigger the personal protection device.

14. The sensor of claim 13, wherein at least one of the first message, the second message, the third message, the first information item, the second information item, and the third information item complies with specifications of a Network Time Protocol.

15. A control unit for triggering a personal protection device for a vehicle, comprising:
a system clock, which is operated for a system for triggering the personal protection device for the vehicle, periodically sending a message, which contains an information item regarding the common system time;
wherein the personal protection device for the vehicle is triggered by performing the following:
receiving at least one sensor value from at least one sensor arrangement, which includes at least one surround sensor and at least one sensor value, from at least one contact sensor, wherein the at least one surround sensor is operated for a system for triggering the personal protection device for the vehicle, by performing the following:
receiving a message, which contains an information item regarding a common system time; and
setting a local clock with respect to the common system time; and
sending a message, which includes an information item regarding the currently acquired sensor value and an information item regarding the time of acquisition, the time of acquisition being in relation to a local sensor time or to the common system time;
estimating a time of impact with a collision object and/or a relative speed of the collision object at the time of acquisition, based on the at least one sensor value of the at least one surround sensor;
determining a relative speed of the collision object at the time of impact, based on the relative speed estimated and/or the estimated time of impact estimated; and
triggering the personal protection device as a function of the relative speed determined and/or the time of impact estimated, and of the at least one sensor value of the contact sensor
wherein the at least one sensor arrangement includes a plurality of sensors and/or surround sensors, and
wherein the at least one sensor arrangement includes the local clock for a local sensor time,
wherein a plurality of processing units, each consisting of a processor, are correspondingly coupled to the plurality of sensors and/or surround sensors,
wherein one of the plurality of processing units is a master unit or the plurality of processing units is coupled to a safety control unit, consisting of a processor, and
wherein the master unit aggregates environmental signals of other ones of the plurality of sensors and/or surround sensors, or the safety control unit aggregates the environmental signals of the plurality of sensors and/or surround sensors, wherein an aggregated environmental signal is supplied, via the master unit or the safety control unit, to a fusion unit, wherein the fusion unit, consisting of a processor, receives contact signals from a plurality of contact sensors, and wherein the fusion unit merges and evaluates the contact signals and the aggregated environmental signal, and wherein the fusion unit is coupled to and is configured to trigger the personal protection device.

16. A system for triggering a personal protection device for a vehicle, comprising:
at least one sensor, including at least one surround sensor having a local clock for a local sensor time,
wherein the at least one surround sensor is operated for a system for triggering a personal protection device for a vehicle, by performing the following:
receiving a message, which contains an information item regarding a common system time; and
setting the local clock with respect to the common system time; and
performing at least one of:
sending a message, which contains an information item regarding the local sensor time; and/or
sending a message, which includes an information item regarding a currently acquired sensor value and an information item regarding a time of acquisition, the time of acquisition being in relation to the local sensor time or to the common system time,
wherein the at least one sensor arrangement includes a plurality of sensors and/or surround sensors, and
wherein the at least one sensor arrangement includes the local clock for a local sensor time,
wherein a plurality of processing units, each consisting of a processor, are correspondingly coupled to the plurality of sensors and/or surround sensors,
wherein one of the plurality of processing units is a master unit or the plurality of processing units is coupled to a safety control unit, consisting of a processor, and
wherein the master unit aggregates environmental signals of other ones of the plurality of sensors and/or surround sensors, or the safety control unit aggregates the environmental signals of the plurality of sensors and/or surround sensors,
wherein an aggregated environmental signal is supplied, via the master unit or the safety control unit, to a fusion unit, consisting of a processor,
wherein the fusion unit receives contact signals from a plurality of contact sensors, and
wherein the fusion unit merges and evaluates the contact signals and the aggregated environmental signal, and
wherein the fusion unit is coupled to and is configured to trigger the personal protection device;
a means for triggering the personal protection device for a vehicle, including the system clock, which is operated for a system for triggering the personal protection device for the vehicle,
periodically sending a message, which contains an information item regarding the common system time,
wherein the personal protection device for the vehicle is triggered by performing the following:
receiving at least one sensor value from at least one surround sensor and at least one sensor value from at least one contact sensor, wherein the at least one surround sensor is operated for a system for triggering the personal protection device for the vehicle, by performing the following:

receiving a message, which contains an information item regarding a common system time; and setting the local clock with respect to the common system time; and sending a message, which includes an information item regarding the currently acquired sensor value and an information item regarding the time of acquisition, the time of acquisition being in relation to the local sensor time or to the common system time;

estimating a time of impact with a collision object and/or a relative speed of the collision object at the time of acquisition, based on the at least one sensor value of the at least one surround sensor;

determining a relative speed of the collision object at the time of impact, based on the relative speed estimated and/or the estimated time of impact estimated; and triggering the personal protection device as a function of the relative speed determined and/or the time of impact estimated, and of the at least one sensor value of the contact sensor.

17. A non-transitory computer readable medium having a computer program, which is executable by a processor, comprising:

a program code arrangement having program code for operating at least one sensor arrangement, which includes a sensor and/or a surround sensor, for a system for triggering a personal protection device for a vehicle, the at least one sensor arrangement having a local clock for a local sensor time, by performing the following:

receiving a message, which contains an information item regarding a common system time; and setting the local clock with respect to the common system time, wherein the at least one sensor arrangement includes a plurality of sensors and/or surround sensors, and wherein the at least one sensor arrangement includes the local clock for a local sensor time, wherein a plurality of processing units, each consisting of a processor, are correspondingly coupled to the plurality of sensors and/or surround sensors, wherein one of the plurality of processing units is a master unit or the plurality of processing units is coupled to a safety control unit, consisting of a processor, and wherein the master unit aggregates environmental signals of other ones of the plurality of sensors and/or surround sensors, or the safety control unit aggregates the environmental signals of the plurality of sensors and/or surround sensors, wherein an aggregated environmental signal is supplied, via the master unit or the safety control unit, to a fusion unit, consisting of a processor, wherein the fusion unit receives contact signals from a plurality of contact sensors, and wherein the fusion unit merges and evaluates the contact signals and the aggregated environmental signal, and wherein the fusion unit is coupled to and is configured to trigger the personal protection device.

18. The non-transitory computer readable medium of claim 17, wherein the message and/or the information item complies with specifications of a Network Time Protocol.

* * * * *